United States Patent [19]

Isaac et al.

[11] Patent Number: 5,664,150

[45] Date of Patent: Sep. 2, 1997

[54] COMPUTER SYSTEM WITH A DEVICE FOR SELECTIVELY BLOCKING WRITEBACKS OF DATA FROM A WRITEBACK CACHE TO MEMORY

[75] Inventors: Gerald George Isaac, Sunnyvale, Calif.; John K. Langgood, Boca Raton, Fla.; Wan Lin Leung, Raleigh, N.C.; Kimberly Kibbe Sendlein, Boca Raton, Fla.; John Joseph Szarek, Cary, N.C.; Edward Yee, Austin, Tex.

[73] Assignee: International Business Machines Corporation, Armonk, N.Y.

[21] Appl. No.: 408,168

[22] Filed: Mar. 21, 1995

[51] Int. Cl.$^6$ .................................................. G06F 13/28
[52] U.S. Cl. ............................ 711/143; 395/872; 395/873
[58] Field of Search ............................ 395/470, 473, 395/481, 872, 873

[56] References Cited

U.S. PATENT DOCUMENTS

| 4,956,768 | 9/1990 | Sidi et al. | 395/873 |
| 5,163,132 | 11/1992 | DuLac et al. | 395/873 |
| 5,396,597 | 3/1995 | Bodin et al. | 395/873 |
| 5,551,006 | 8/1996 | Kulkarni | 395/473 |
| 5,553,266 | 9/1996 | Metzger et al. | 395/471 |
| 5,555,398 | 9/1996 | Raman | 395/470 |

*Primary Examiner*—David L. Robertson
*Attorney, Agent, or Firm*—George Grosser

[57] ABSTRACT

A computer system that has a main memory and a writeback cache memory also has an I/O device capable of data streaming. A memory controller responds to signals that the I/O device will perform a burst transfer of data to the main memory and blocks potential writebacks from the cache memory to the I/O device. Potential writing over of the data from the I/O device by a flushed cache line written back to the main memory is thereby prevented. The system performance is increased since the data from the I/O device can be written to the main memory without waiting for a snoop cycle and a writeback to be performed.

16 Claims, 4 Drawing Sheets

COMPUTER SYSTEM WITH A DEVICE FOR SELECTIVELY BLOCKING WRITEBACKS OF DATA FROM A WRITEBACK CACHE TO MEMORY

BACKGROUND OF THE INVENTION

1. Technical Field of the Invention

The present invention relates to data storage in a memory system of a computer, and more particularly, to the control of data transfers to a memory system having at least one cache and a main memory.

2. Description of the Related Art

Modern computer systems often incorporate cache memories to take advantage of available high performance microprocessors. A cache memory is a block of very fast memory, normally high-speed static random access memory (SRAM), that is located between the microprocessor and the main memory. The data or instructions that are kept in the cache memory are those data or instructions that the microprocessor is most likely to need next. If the information the microprocessor requests next is held within the cache memory, this information can be retrieved without wait states. This is called a cache hit. If the data needed by the microprocessor is not in the cache memory, the data must be retrieved from the main memory and wait states are needed. This is called a cache miss.

One type of cache memory is a "write-through cache" (also commonly referred to as a store-through cache). In such a cache, no attempt is made to speed up a microprocessor write operation. Microprocessor write commands are pushed through the write-through cache immediately so that the data is written both to the cache and the main memory, with the normal wait-state delays, at the same time. The write-through cache is a conservative design since it guarantees that main memory and the cache are constantly in agreement.

A faster cache memory is a "writeback cache", which allows the microprocessor to write changes to the cache memory, but not necessarily to the main memory at the same time. As time allows, the data in the cache is written back to the main memory. One of the problems with the writeback cache is that there are times when a main memory and the cache memory have different contents assigned to the same memory locations.

A writeback cache is divided into smaller units, referred to as cache lines, and correspond to the lines of storage used by microprocessors. Main memory is normally divided into blocks, with cache lines in the cache corresponding to the locations within such a memory block. When data is written into the main memory, this data will then be considered to be written to a cache line. Write cycles in which a cache line of the cache is updated, but in which the data is not yet stored in the main memory, creates a cache line in the cache that is considered "dirty". In other words, a dirty cache line is one which contains data that has been updated, but has not yet been written back to the cache line in the main memory.

For systems with writeback caches, and an input/output (I/O) that writes data to main memory, it is first determined whether the cache line which is being written to is dirty, by "snooping" the cache memory. A snoop is essentially an inquiry to the cache memory requesting that a potentially dirty line be written out of the cache memory and subsequently invalidated. If the snoop cycle indicates that the cache line to which the write to main memory is being directed is a dirty line, then a writeback to main memory will be performed prior to the writing of data in the main memory. A writeback flushes the snooped cache line out of the cache memory and writes it back to the main memory. There is a latency between determining that the cache line is dirty and the commencement of a writeback. This latency is the greatest when the system has an internal cache and an external cache and the cache line is dirty in both of these caches. There is a further penalty performance when synchronization between two frequency domains is necessary, such as when the processor runs at X MHZ, and the memory controller runs at Y MHZ.

Certain computer systems, such as file server systems, contain high-speed I/O devices. In these systems, the memory subsystem performance needs to be maximized to support the data transfer rates between the main memory and the I/O channel. This is particularly important within a file server system that contains I/O devices capable of performing data streaming in which data is sent in bursts. If the memory subsystem cannot maintain the transfer of data to main memory as the same rate as the data is being supplied by the I/O device, then a bus controller will interject wait states on the bus until the memory controller is ready to accept more data.

Since the length of a burst transfer of a high-performance data streaming I/O device is normally less than the length of a cache line, cached dirty data is normally written back to main memory before the data from the I/O device is allowed to write into main memory. This writeback requires the snoop cycle, a snoop-to-writeback latency, and the actual writeback before the data can be written to the main memory by the I/O device. If the data from the I/O device were allowed to be written in main memory without performing a snoop cycle, a subsequent writeback would immediately write over the data from the I/O device. The performance of a system having a writeback cache and a high-performance I/O device is slowed due to the clock cycles required for the snoop cycle, the snoop-to-writeback latency, and the writeback of the dirty cache line prior to the writing of the data from the I/O device to main memory. Even when the snoop cycle does not detect a dirty cache line, the snoop cycle itself occupies clock cycles that reduce performance.

SUMMARY OF THE INVENTION

There is a need for a computer system that uses both writeback cache memories and high-performance I/O devices, which ensures data integrity but does not sacrifice the performance advantages of the I/O devices due to writebacks of cache lines to the main memory.

This and other needs are met by the present invention which provides a computer system comprising a memory, at least one cache having cache lines, each cache line having a cache line size, the cache performing writebacks of cache data to the memory. A data input device is coupled to the cache and the memory and transfers data to at least one of the cache and the memory. The data input device has a transfer size that may be more or less than the cache line size. At least one buffer is coupled to the data input device and buffers data to be transferred between the data input device and the memory. A memory controller is coupled between the buffer and the cache and the memory for blocking a writeback of the cached data from the cache to the memory when the buffer is full with data that is to be transferred to the memory from the data input device.

Since the memory controller blocks the writeback of the cached data from the cache to the memory when the buffer is full, the high-performance characteristics of the data input device within the computer system are preserved. The system does not have to wait until the dirty data from the cache is written back to the memory before writing the transfer of data to the memory since this writeback is blocked. The present invention takes advantage of the fact that a writeback of the cached data to the memory is not necessary since any data in this location in the memory will merely be written over immediately by the data from the data input device.

In certain embodiments of the invention, a bus controller is coupled to the data input device and the memory controller and determines whether the data input device is to perform a burst transfer of data to the memory and will provide a burst signal to the memory controller. This bus controller has first and second buffers that hold up to M-bytes of data, such as 16 bytes, and will generate buffer full signals when these buffers are full of data. Upon the signaling to the memory controller that the first and/or second buffer is full of data, and that the bus controller wants to perform a burst transfer of data to the memory, the bus controller will generate a burst signal, and a first buffer full and a second buffer full signal. This causes the memory controller to prevent a writeback of the cached data from the cache to the memory.

In another aspect of the present invention, a bus controller is provided for controlling data transfer between a data input device and a memory system having a memory and at least one cache divided into cache lines and a memory controller responsive to signals from the bus controller to control the memory system. The bus controller comprises a first buffer that stores up to M-bytes of data to be transferred from the data input device, and a second buffer that stores up to M-bytes of data to be transferred from the data input device. The bus controller includes logic for generating a first buffer full signal to the memory controller when the first buffer contains M-bytes of data, and logic for generating a second buffer full signal to the memory controller when the second buffer contains M-bytes of data.

The bus controller of the present invention provides signals that can be used by a memory controller to block the writing back of a dirty cache line to a memory when the conditions are proper for performing a transfer of a certain amount of data to the memory from the data input device.

In another aspect of the present invention, a memory controller is provided for controlling data transfer between a writeback cache, a memory and a data input device. A memory controller receives input signals from a bus controller indicating that the bus controller has full buffers of data to be transferred to the memory and is ready to perform the transfer. The memory controller has logic for determining in response to the first buffer full signal that the bus controller is ready to perform the transfer of M-bytes of data. Logic is provided for snooping the cache to determine whether a cache line to which the data from the data input device is to be transferred has not been written back from the cache to the memory. Logic is provided for causing writing back of the cache line to memory when the cache line has not yet been written back to memory and the data input device is not to perform the transfer of data. The memory controller also has logic for blocking the writing back of the cache line from the cache to the memory when it is determined that the bus controller will perform the transfer of data and that the bus controller is ready to perform such a transfer.

The memory controller of the present invention is responsive to the signals of a bus controller which indicate that the bus controller will transfer a certain amount of buffered data in order to block the writing back of data to the main memory.

Other advantages and novel features of the present invention will become apparent from the following detailed description of the invention when considered in conjunction with the accompanying drawings.

DESCRIPTION OF THE ILLUSTRATIVE EMBODIMENTS

Figure 1:
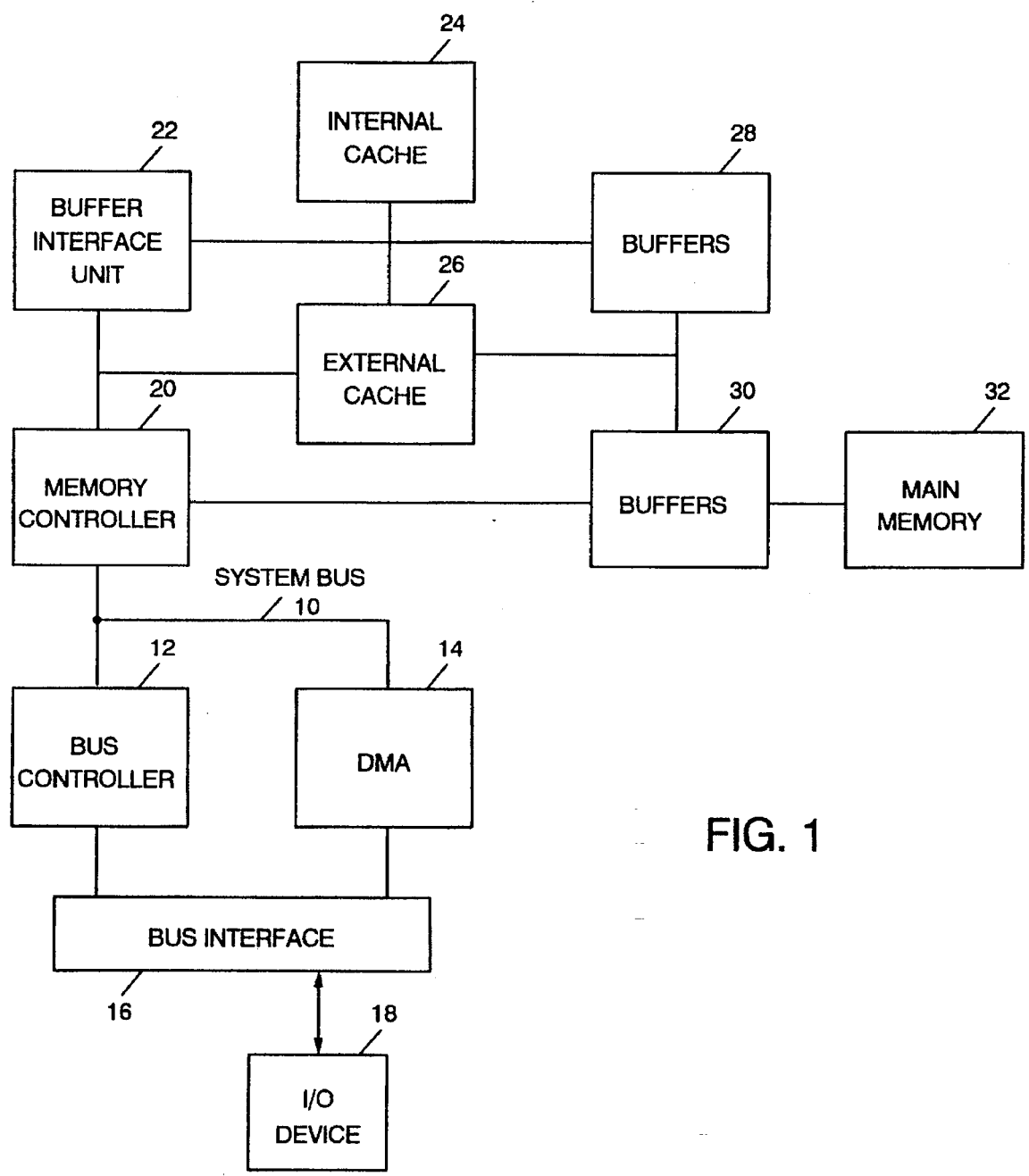
FIG. 1 is a block diagram of a system constructed in accordance with an embodiment of the present invention.

FIG. 1 is a block diagram of a system constructed in accordance with an embodiment of the present invention and includes a system bus 10 to which a bus controller 12 and a direct memory access controller 14 are coupled. Bus controller 12 can be, for example, a bus controller for MICROCHANNEL™ architecture (a trademark of IBM). An interface 16 provides the interfacing between the bus controller 12 and an input/output (I/O) device 18. The I/O device 18 can be a high-performance, data streaming device such as used with the MICROCHANNEL™ architecture. Such an I/O device 18 is capable of sending data in a burst transfer in 4 or more bytes, or in multiple cache lines.

The system bus 10 couples the bus controller 12 to a memory controller 20. Data can be stored in an internal cache 24, an external cache 26, and/or a main memory 32. Buffers 28 and 30 are also provided in this memory subsystem.

A buffer interface unit 22 is responsive to signals from the memory controller 20 to control the writing back of the data from the caches 24, 26 through the buffers 28, 30 to the main memory 32.

For transfers of data from the I/O device 18 to the main memory 32 that are not burst transfers, the system of the present invention operates like other systems using writeback caches. As an example, assume that data is in either the internal cache 24 and/or the external cache 26, but has not been written back to the cache line in main memory 32 corresponding to the cache line in which the data is located in the internal cache 24 and/or the external cache 26. Upon receiving an I/O write request to main memory 32, the memory controller 20 snoops the caches 24, 26 to determine whether the data from the I/O device 18 will be written into the cache line of the main memory 32 that corresponds to a dirty cache line in the caches 24, 26. If the snoop cycle hits a dirty cache line, a writeback is scheduled which flushes the snooped cache line out of the caches 24, 26. This snoop cycle requires 11 clock signals, for example.

There is a latency (7 clock cycles, for example) between determining that the cache line is dirty and the commencement of the writeback. This latency is the greatest when the cache line is dirty in both the internal cache 24 and the external cache 26. The writeback to main memory 32 of the dirty cache line in the cache 24, 26 is then performed and can take 21 clock cycles to complete for a 32-byte cache line. Thus, the snoop, the snoop-to-writeback to latency, and the actual writeback to be performed can require 39 clock cycles, for example.

When data is to be written by the I/O device 18 in 16-byte burst transfers, the large number of clock cycles required for the snoop, the latency and the actual writeback, hamper the performance of the I/O device 18. The present invention takes advantage of the contiguous nature of the I/O device 18 which is a data streaming device to increase the speed of writes to main memory 32. This is accomplished in the present invention by the independent and parallel writing of the data into the main memory 32 during the snooping of the cache, and the blocking of any writeback from the cache to the main memory 32.

Figure 2:
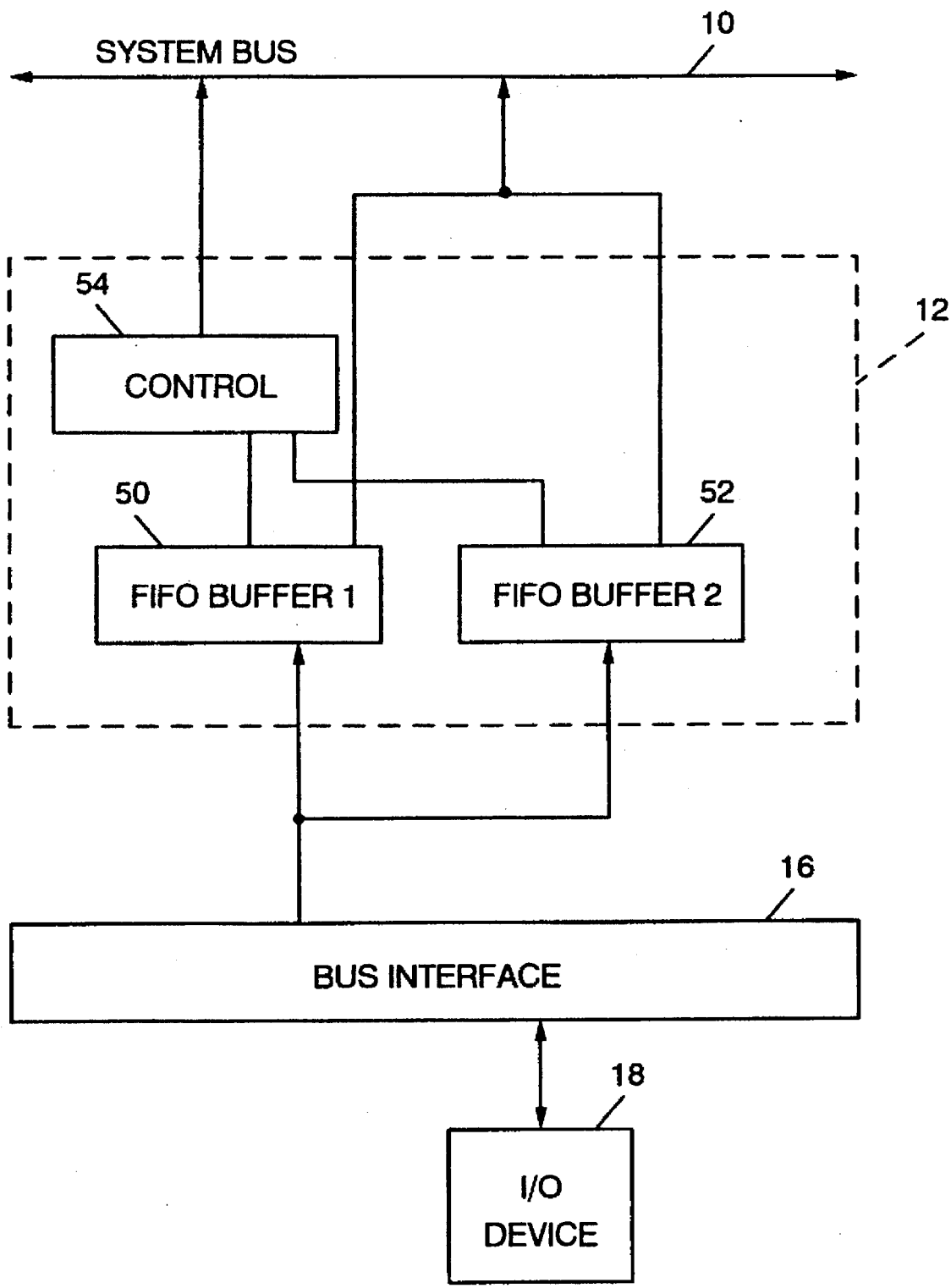
FIG. 2 is a block diagram of a bus controller constructed in accordance with an embodiment of the present invention.

FIG. 2 is a block diagram of a bus controller 12 constructed in accordance with an embodiment of the present invention. Bus controller 12 is coupled to the bus interface 16 and a system bus 10. The data from the I/O device 18 is loaded in one of two first-in, first-out (FIFO) buffers 50, 52. Control logic 54 controls the flow of data from the FIFO buffers 50, 52 to the system bus 10, as well as provides control signals to the system bus 10. When either of the two FIFO buffers 50, 52 is full, the bus controller 12 indicates its desire to burst write the data in the FIFO buffers 50, 52 to the main memory 32. The first FIFO buffer 50 is loaded with data aligned on a 32-byte boundary (address bytes (4:0)= "00000"), and the second FIFO buffer 52 is associated with the buffer that is loaded with data aligned on the next contiguous 16-bytes (address bytes (4:0)="10000").

The present invention recognizes that if two consecutive and contiguous 16-byte write cycles from the bus controller 12 occur, it serves no purpose to write back the 32-byte cache line from the cache 24, 26 before allowing the bus controller 12 to write over all 32 bytes of data. Even when the memory controller 20 receives an indication that the length of the write cycle from the bus controller 12 will only be 16 bytes, at least one-half of the writeback can be eliminated. All of the writeback can be eliminated when two consecutive and contiguous 16-byte cycles occur.

In the following operational example, assume that both the first and second FIFO buffers 50, 52 are full. The bus controller 12 starts a write cycle by asserting an address signal. In response to certain conditions, the memory controller 20 instructs the bus interface unit 22 to block the first 16 bytes of a potential writeback from either cache 24, or cache 26 to the main memory 32. These conditions are: (1) the cycle is a write cycle; (2) the address is 32-byte aligned; (3) a buffer full signal is active, indicating that the first FIFO buffer 50 is full; and (4) a burst signal from the bus controller 12 is active. These conditions ensure that at least 16-bytes will be burst into the main memory 32 by the bus controller 12, so that the memory controller 20 will unconditionally allow the write cycle to proceed independent of, and in parallel to, the snoop cycle.

The memory controller 20 indicates that the first half of a potential writeback is to be blocked by asserting a block signal during the snoop cycle. This block signal prevents the bus interface unit 22 from passing any other cycle to the memory controller 20. This includes the writing back of a cache line from the caches 24, 26 to the main memory 32.

If all of the four conditions mentioned above are not met, the memory controller 20 would assert the block signal with a level that instructs the bus interface unit 22 to allow a potential writeback to occur.

Following this first 16-byte bus controller write cycle, the memory controller 20 waits for the bus controller 12 to assert another address signal within a predetermined time period, for example, three clock cycles. The bus controller 12 will assert the address signal within this time period if and only if the second FIFO buffer 52 is full. In this operational example, the second FIFO buffer 52 is full so that the bus controller 12 will assert the address signal within the three-clock cycle window. The memory controller 20 instructs the bus interface unit 22 to block the second 16-bytes of a potential writeback when the following conditions are true: (1) the cycle is a write cycle; (2) the address is the next contiguous 16 bytes; (3) the second FIFO buffer full signal is active; and (4) the burst signal is active. The buffer instruction unit 22 is instructed to block the second half of a writeback by monitoring for a low-to-high transition of the block signal followed by a high-to-low transition of the block signal. The memory controller 20 then allows the bus controller 12 to burst write the second 16 bytes directly into main memory 32.

If the second bus controller write cycle did not meet the above conditions, or if the address signal is not asserted within the three-clock cycle window, then the memory controller 20 drives the block signal high where it remains throughout the cycle. This instructs the bus interface unit 22 to initiate a half-writeback of 16 bytes, with the starting address being the second half of the 32-byte cache line. The bus interface unit 12 does not drive address bit 4. Accordingly, the memory controller 20, knowing that a half-writeback is pending, will internally force this bit to a one. During the half-writeback, the bus controller cycle that did not meet the above qualifications remains pending until the completion of the half-writeback.

Where a 16-byte cycle is performed in 11 clock cycles, the present invention can perform the two consecutive and contiguous 16-byte burst write cycles within 24 clock cycles (two 11 cycle write-cycles, and two inter-cycle wait states). This 24 clock cycle total is a reduction from the sixty-three clock cycles that would otherwise be required without the present invention (39 clock cycles for the snoop cycle, latency and writeback and 24 clock cycles for the write cycles). There is a reduction in the total number of clock cycles even if the write cycles do not hit a dirty cache line since the snoop cycle by itself will occupy 11 clock cycles. Thus, if the snoop does not hit a dirty cache line, there is a reduction in the total clock cycles from 35 to 24 clock cycles using the present invention.

By the blocking of any potential writebacks, and allowing a write to main memory to occur independently of and in parallel to a snoop cycle, the present invention takes advantage of the contiguous nature of bus master devices that perform data streaming to increase the overall performance of the system.

Figure 3:
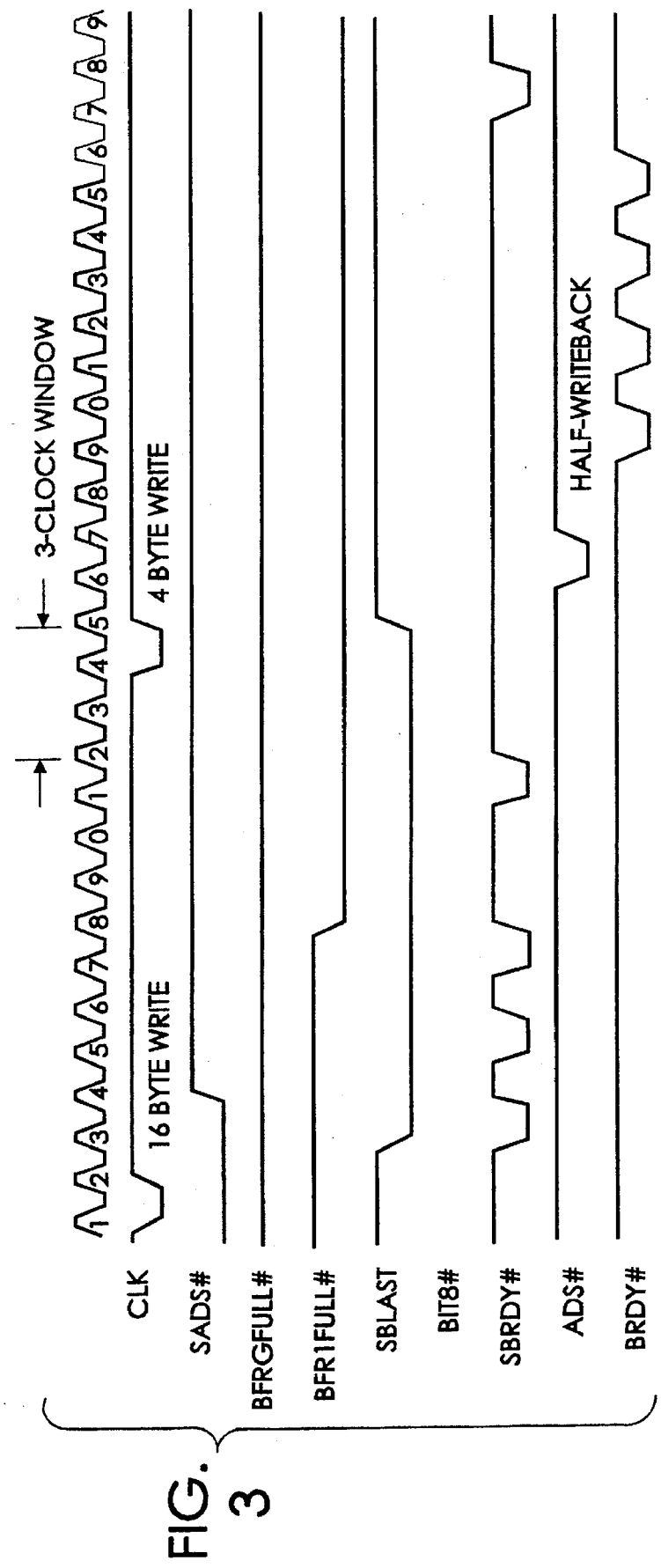
FIG. 3 is a timing diagram of consecutive, contiguous burst write cycles, where the first cycle is 32-byte aligned.
Figure 4:
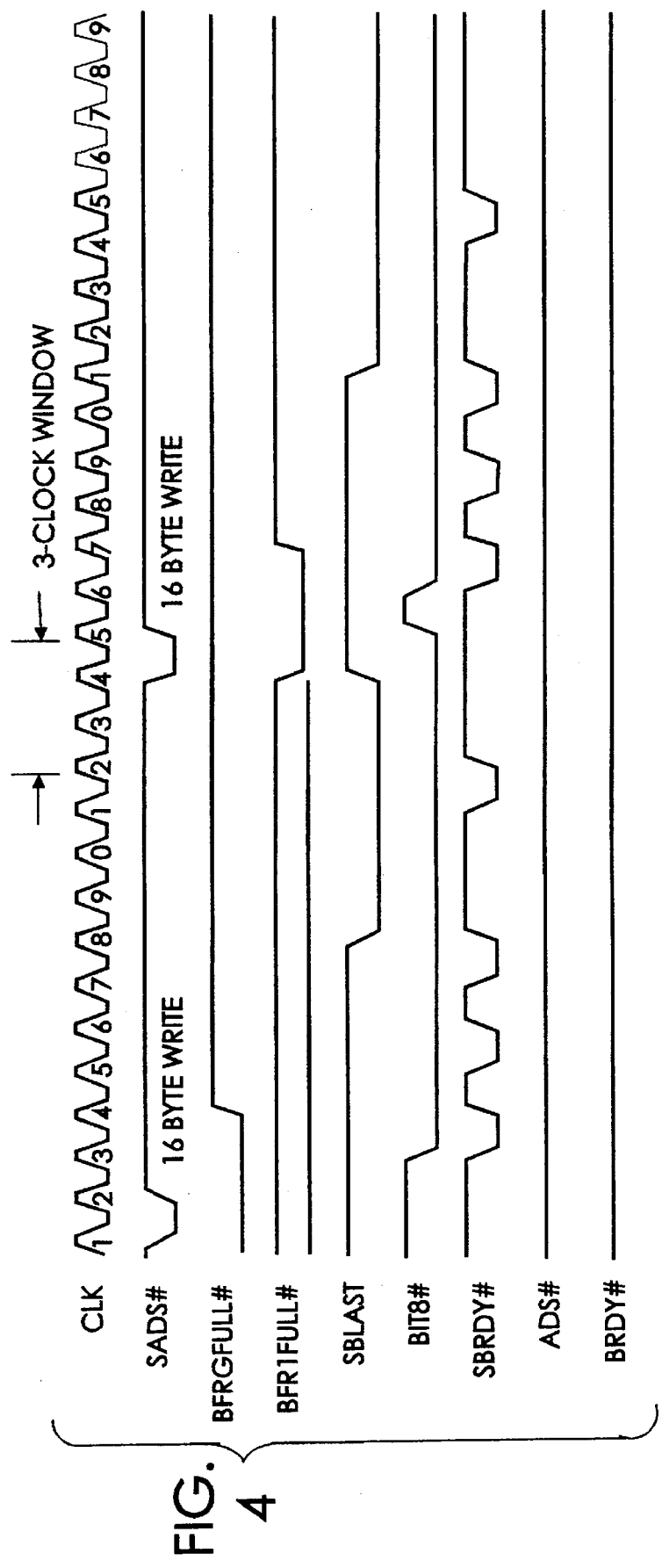
FIG. 4 is a timing diagram of a 32-byte aligned burst write cycle followed by a 4-byte write cycle.

A timing diagram of a write cycle requiring a complete blocking of the writeback is illustrated in FIG. 3, while FIG. 4 is a timing diagram of a write cycle that requires only a half-writeback.

Although the invention has been described and illustrated in detail, it is to be clearly understood that the same is by way of illustration and example, and it is not to be taken by way of limitation. The spirit and scope of the present invention are to be limited only by the terms of the appended claims.

What is claimed is:

1. A computer system comprising:
   a memory;
   at least one cache having cache lines, each cache line having a cache line size, the cache performing writebacks of cached data to the memory;
   a data input device coupled to the cache and the memory for transferring data to at least one of the cache and the memory, and having a transfer size less than the cache line size;

at least one buffer coupled to the data input device for buffering data to be transferred between the data input device and the memory; and a memory controller coupled between the buffer and the cache and the memory for blocking a writeback of the cached data from the cache to the memory when the buffer is full with data that is to be transferred to the memory from the data input device.

2. The system of claim 1, further comprising a bus controller coupled to the data input device and the memory controller for determining whether the data input device is to perform a burst transfer of data to the memory and providing a burst signal to the memory controller indicating that the data input device is to perform the burst transfer of data, the bus controller containing the at least one buffer, wherein the memory controller is responsive to the burst signal and the buffer being full to block the writeback of the cached data.

3. The system of claim 2, further comprising a bus interface unit coupled to the cache and to the memory controller and responsive to the memory controller to block the writeback of the cached data.

4. The system of claim 3, wherein the at least one buffer of the bus controller includes a first buffer that holds up to M-bytes of data, produces the data for write cycles and generates a first buffer full signal when the first buffer is full.

5. The system of claim 4, wherein the bus controller generates a burst signal, the memory controller having inputs for receiving the burst signal and the first buffer full signal and in response generates a first block signal to the bus interface unit that causes the bus interface unit to block the writeback to memory of a first M-byte block of data within the cache in response to the memory controller receiving the burst signal and the first buffer full signal.

6. The system of claim 5, wherein the bus controller has a second buffer that holds up to M-bytes of data, produces the data for write cycles and generates a second buffer full signal when the second buffer is full.

7. The system of claim 6, wherein the memory controller has an input for receiving the second buffer full signal, and in response generates a second block signal to the bus interface unit that causes the bus interface unit to block the writeback to memory of a second M-byte block of data within the cache in response to the memory controller receiving the burst signal and the second buffer full signal.

8. The system of claim 7, wherein the memory controller prevents generation of the second block signal if the M-bytes in the second block of data are not located contiguous to the M-bytes in the first block of data.

9. The system of claim 8, wherein M is 16.

10. The system of claim 8, wherein the memory controller prevents the generation of the second block signal when a signal is not received from the bus controller within a predetermined time period after a burst transfer of the first block of data.

11. The system of claim 8, wherein a cache line size is 2*M bytes of data.

12. The system of claim 11, wherein M is 16.

13. The system of claim 1, wherein the memory controller includes logic for snooping the cache to determine whether a cache line to which the data from the data input device is to be transferred has not been written back to the memory, and writing the cache line back to memory when the cache line has not yet been written back to memory and the data input device is not to perform a burst transfer of data.

14. A memory controller process for controlling data transfer between a writeback cache, a memory and a data input device, the memory controller receiving input signals from a bus controller indicating that the bus controller is to perform a transfer of buffered data to the memory and is ready to perform the transfer, the memory controller process comprising the steps of:

determining in response to at least one buffer full signal from the bus controller that the bus controller will perform a transfer of buffered data;

determining in response to a first one of the buffer full signals that the bus controller is ready to perform a transfer of M-bytes of buffered data;

snooping the cache to determine whether a cache line to which the data from the data input device is to be transferred has not been written back from the cache to the memory;

causing writing back of the cache line to memory when the cache line has not yet been written back to memory and the data input device is not to perform a transfer of the buffered data; and blocking the writing back of the cache line from the cache to the memory when it is determined that the bus controller will perform a transfer of the buffered data and that the bus controller is ready to perform a transfer of buffered data.

15. The memory controller process of claim 14, further comprising the steps of determining in response to a second buffer full signal that the bus controller is ready to perform a second transfer of M-bytes of buffered data.

16. The memory controller process of claim 15, wherein the step of blocks blocking only step of blocks a portion of the writing back of the cache line if it is determined that only the first buffer full signal indicates that the bus controller is ready to perform a burst transfer of the M-bytes of data, and for completely blocking a writing back of the cache line if it is determined that both the first and second buffer full signals indicate that the bus controller is ready to perform a transfer of M-bytes of buffered data.

* * * * *